United States Patent
Okamoto et al.

(10) Patent No.: US 8,262,378 B2
(45) Date of Patent: Sep. 11, 2012

(54) METHOD FOR MULTILAYER MOLDING OF THERMOPLASTIC RESINS AND MULTILAYER MOLDING APPARATUS

(75) Inventors: Akio Okamoto, Sanyouonoda (JP); Kazuaki Miyamoto, Ube (JP)

(73) Assignee: Ube Machinery Corporation, Ltd., Ube (JP)

( * ) Notice: Subject to any disclaimer, the term of this patent is extended or adjusted under 35 U.S.C. 154(b) by 0 days.

(21) Appl. No.: 12/458,773

(22) Filed: Jul. 22, 2009

(65) Prior Publication Data

US 2010/0015268 A1  Jan. 21, 2010

Related U.S. Application Data

(62) Division of application No. 11/990,780, filed as application No. PCT/JP2006/316508 on Aug. 23, 2006.

(30) Foreign Application Priority Data

Aug. 25, 2005 (JP) ................. 2005-244365

(51) Int. Cl.
- B29C 31/10 (2006.01)
- B29C 33/40 (2006.01)
- B29C 44/34 (2006.01)
- B29C 67/20 (2006.01)

(52) U.S. Cl. ........ 425/4 R; 425/130; 425/543; 425/582; 425/589; 425/441

(58) Field of Classification Search ............... 425/4 R, 425/4 C, 130, 134, 567, 573, 589, 450.1, 425/817 R, 817 C, 543, 544, 577, 582, 587, 425/DIG. 242

See application file for complete search history.

(56) References Cited

U.S. PATENT DOCUMENTS

| | | | | |
|---|---|---|---|---|
| 3,391,423 A | * | 7/1968 | Charvat et al. | 425/4 R |
| 3,909,169 A | * | 9/1975 | Barrie | 425/130 |
| 3,947,175 A | * | 3/1976 | Melcher | 425/130 |

(Continued)

FOREIGN PATENT DOCUMENTS

CA 2237064 A1 11/1998

(Continued)

OTHER PUBLICATIONS

Technology of microcellular plastic, Seikei Kakou, 2001, No. 2, vol. 13, pp. 90-95.

(Continued)

*Primary Examiner* — Joseph S. Del Sole
*Assistant Examiner* — Seyed Masoud Malekzadeh
(74) *Attorney, Agent, or Firm* — Edwards Wildman Palmer LLP; James E. Armstrong, IV; Junko Harada

(57) ABSTRACT

A multilayer-molding method includes the steps of mixing at least one thermoplastic resin selected from a plurality of types of thermoplastic resins with a bubble-nucleating agent and a foaming gas, injecting the plurality of types of thermoplastic resins into a mold cavity such that the thermoplastic resins are layered in the mold cavity, and then, after increasing the volume of the mold cavity, foaming the at least one thermoplastic resin mixed with the bubble-nucleating agent and the foaming gas. The multilayer-molding method is characterized in that the foaming gas is supplied at a pressure of 0.1 MPa or more but less than 1.0 MPa to at least one injection-molding machine selected from a plurality of injection-molding machines, and that the thermoplastic resin plasticized in the injection-molding machine is mixed with the foaming gas.

3 Claims, 3 Drawing Sheets

U.S. PATENT DOCUMENTS

| | | | | |
|---|---|---|---|---|
| 4,017,225 A * | 4/1977 | Hanning | 425/4 R |
| 4,096,218 A * | 6/1978 | Yasuike et al. | 264/45.5 |
| 4,124,308 A * | 11/1978 | Sokolow | 366/77 |
| 4,133,858 A * | 1/1979 | Hayakawa et al. | 264/54 |
| 4,141,470 A * | 2/1979 | Schulte et al. | 222/137 |
| 4,155,969 A * | 5/1979 | Hendry | 264/45.1 |
| 4,164,523 A * | 8/1979 | Hanning | 264/28 |
| 4,206,165 A * | 6/1980 | Dukess | 264/45.9 |
| 4,783,292 A * | 11/1988 | Rogers | 264/40.6 |
| 5,049,327 A * | 9/1991 | Hara et al. | 264/45.5 |
| 5,334,356 A | 8/1994 | Baldwin et al. | |
| 5,344,596 A * | 9/1994 | Hendry | 264/40.3 |
| 5,628,944 A * | 5/1997 | Nagasaka et al. | 264/46.9 |
| 5,702,810 A | 12/1997 | Koseki et al. | |
| 5,716,560 A * | 2/1998 | Heuchert et al. | 264/37.17 |
| 5,997,781 A * | 12/1999 | Nishikawa et al. | 264/45.1 |
| 6,129,870 A * | 10/2000 | Hettinga | 264/40.5 |
| 6,146,577 A | 11/2000 | Yamaki et al. | |
| 6,231,798 B1 * | 5/2001 | Matsumoto et al. | 264/255 |
| 6,322,347 B1 * | 11/2001 | Xu | 425/376.1 |
| 6,328,916 B1 * | 12/2001 | Nishikawa et al. | 264/53 |
| 6,403,014 B1 * | 6/2002 | Hendry et al. | 264/500 |
| 6,602,063 B1 | 8/2003 | Cardona | 425/4 R |
| 6,616,434 B1 * | 9/2003 | Burnham et al. | 425/4 R |
| 6,790,020 B2 * | 9/2004 | Kitayama et al. | 425/4 R |
| 6,997,690 B2 * | 2/2006 | Bellasalma et al. | 425/4 R |
| 7,150,615 B2 * | 12/2006 | Sugihara et al. | 425/4 R |
| 7,361,294 B2 * | 4/2008 | Pierick et al. | 264/50 |
| 2002/0017734 A1 | 2/2002 | Sugihara et al. | |
| 2003/0003291 A1 * | 1/2003 | Shah et al. | 428/317.9 |
| 2005/0003032 A1 | 1/2005 | Sugihara et al. | |
| 2005/0006805 A1 | 1/2005 | Sugihara et al. | |
| 2005/0245625 A1 | 11/2005 | Miyazaki | |

FOREIGN PATENT DOCUMENTS

| | | |
|---|---|---|
| CA | 2477149 A1 | 9/2003 |
| CA | 2 480 025 | 9/2007 |
| JP | 49-25061 | 3/1974 |
| JP | 43-9913 | 4/1978 |
| JP | 44-6080 | 3/1979 |
| JP | 6-506724 | 7/1994 |
| JP | 3023741 | 8/1994 |
| JP | 11-077711 | 3/1999 |
| JP | 2002-079545 A | 3/2002 |
| JP | 2002-200640 A | 7/2002 |
| JP | 2004-034381 | 2/2004 |
| JP | 2004-035656 | 2/2004 |
| JP | 2004-066501 A | 3/2004 |
| JP | 2004-195884 * | 7/2004 |
| JP | 2005-074794 | 3/2005 |
| WO | WO-98/52734 A1 | 11/1998 |

OTHER PUBLICATIONS

Office Action mailed Aug. 26, 2009, issued on the corresponding Canadian Patent Application No. 2,618,877.

Canadian Office Action of application 2,618,877 dated May 4, 2010.

* cited by examiner

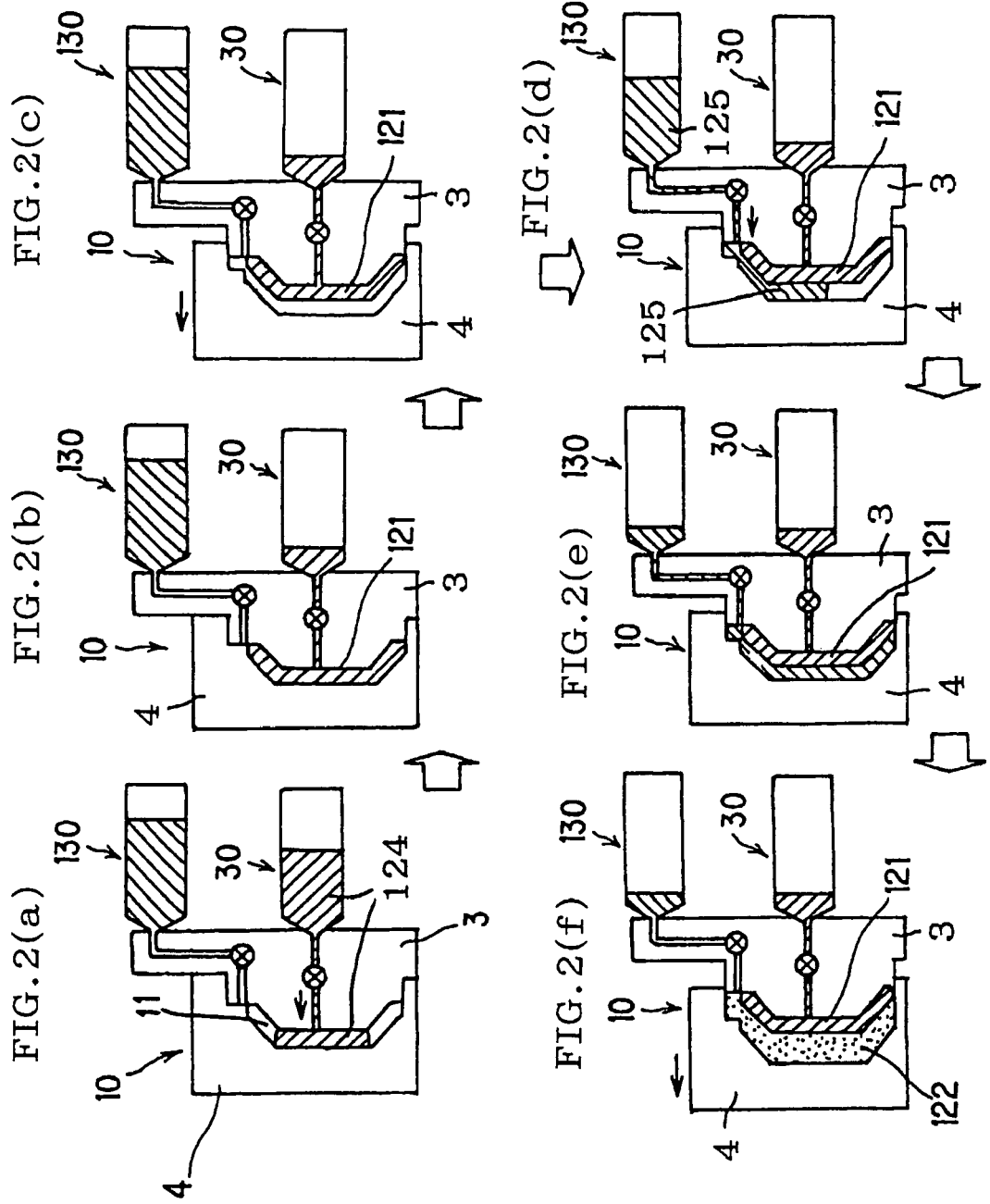

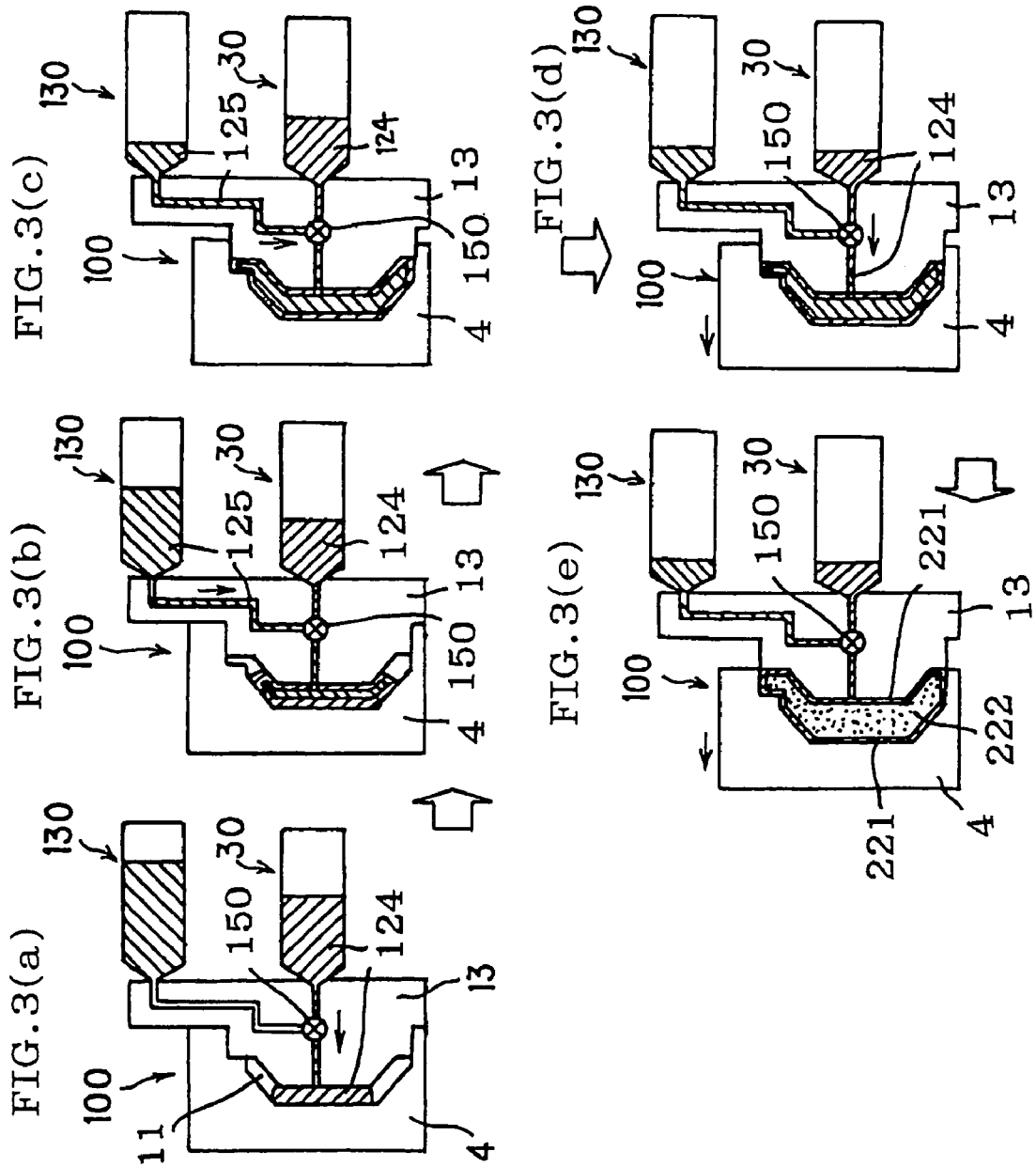

METHOD FOR MULTILAYER MOLDING OF THERMOPLASTIC RESINS AND MULTILAYER MOLDING APPARATUS

This application is a divisional application of U.S. application Ser. No. 11/990,780, filed Feb. 21, 2008, and claims the right of priority under 35 U.S.C. §119 based on Japanese Patent Application No. 2005-244365 filed Aug. 25, 2005, which is hereby incorporated by reference herein in its entirety as if fully set forth herein.

TECHNICAL FIELD

The present invention relates to a multilayer-molding method of molding thermoplastic resins and a multilayer-molding apparatus for performing the multilayer-molding method.

BACKGROUND ART

Multilayer-molded products of thermoplastic resins that contain a foam layer and a non-foamed layer have been used in various fields for a long time. The foam layer in a multilayer-molded product is light in weight and has excellent heat-insulating properties, sound-absorbing properties, and texture, because of bubbles inside the resin. The non-foamed layer in a multilayer-molded product can provide rigidity and excellent appearance. In recent years, in particular, resins used in products have been foamed to reduce the amount of resin for the purpose of weight reduction. Combined with the cost reduction resulting from the weight reduction, multilayer-molded products that contain a foam layer have found wider applications.

A foam layer in a multilayer-molded product is manufactured by physical foaming or chemical foaming according to the type of a foaming agent to be mixed with a resin. The physical foaming utilizes an inert gas, such as nitrogen or carbon dioxide, or a volatile substance, such as a hydrocarbon or a fluorocarbon, as a physical foaming agent. The chemical foaming utilizes an organic foaming agent, such as an azo compound or a nitroso compound, or an inorganic foaming agent, such as sodium bicarbonate, as a chemical foaming agent. A multilayer-molding method includes injecting a molten resin that contains a foaming agent and a resin material into a mold cavity, injecting a molten resin that contains a resin material and no foaming agent into the mold cavity, and foaming a resin mixed with the foaming agent. A multilayer-molded product thus manufactured includes a foam layer that contains bubbles having a diameter of about 80 to 300 μm and a non-foamed layer.

As a method for manufacturing a foam-molded product serving as a foam layer in a multilayer-molded product, for example, Patent Document 1 discloses a method for forming a foam-molded product having bubbles therein, in which an olefin resin mixed with a chemical foaming agent or a physical foaming agent is foamed by a short-shot method. According to the method disclosed in Patent Document 1, in a molding apparatus including an extruder, an accumulator, and a mold, a molten resin that contains a resin material mixed with an inert gas, such as a nitrogen gas, a volatile substance, such as a hydrocarbon or a fluorocarbon, or a chemical foaming agent is fed to the accumulator with an extruder. The molten resin fed to the accumulator is injected into the mold and is foamed, thus yielding a foam-molded product that contains bubbles therein.

Furthermore, for example, Patent Document 2 discloses a method for manufacturing a foam-molded product using a physical foaming agent, in which air, another gas, or a volatile substance is fed under pressure from an extruder hopper simultaneously with resin-material feed. The melting of the resin material and the inclusion and dispersion of bubbles are performed with a screw extruder. According to the method disclosed in Patent Document 2, a molded product of a sponge-like substance that contains closed cells can be manufactured by using a polyethylene resin and air having a pressure in the range of about 0.69 to 0.78 MPa.

Furthermore, for example, Patent Document 3 discloses a method for remarkably increasing the bubble density (the number of bubbles per unit volume) by using carbon dioxide, an inert gas, in a supercritical state as a foaming gas, as compared with bubbles formed in a molded product using a conventional chemical foaming agent or a conventional physical foaming agent. According to the method disclosed in Patent Document 3, a molding apparatus is provided with a system composed of a booster and a feeder of a supercritical fluid and a gas cylinder. Carbon dioxide in a supercritical state is injected and dissolved into a molten resin via a cylinder of the molding apparatus. The molten resin that contains dissolved carbon dioxide is injected into a mold, and is foamed, thus yielding a resin-molded product that contains ultrafine pores, called microcells, having a size less than 1 μm therein.

[Patent Document 1] JP-B-44-6080
[Patent Document 2] JP-B-43-9913
[Patent Document 3] JP-K-6-506724
[Non-patent Document 1] SEIKEI KAKOU, 2001, No. 2, Vol. 13

DISCLOSURE OF THE INVENTION

However, the following problems become obvious when the above-mentioned known methods for manufacturing a foam-molded product are used to form a foam layer in a multilayer-molded product.

In a case where means for supplying a resin and an organic chemical foaming agent (such as an azo compound or a nitroso compound) are employed (see Patent Document 1), pyrolysates, including corrosive ammonia, gases, such as carbon monoxide and water vapor, cyanic acid, and isocyanic acid, are released in the air, and undesirably remain in a foam layer. Furthermore, when sodium bicarbonate (inorganic foaming agent) is used as a foaming agent, a minute amount of reaction residues, including alkaline components, discolor a multilayer-molded product (final product), and impair the weatherability of the multilayer-molded product. In particular, the reaction residues corrode aluminum particles contained in an aluminum coating.

On the other hand, in a case where means for supplying a physical foaming agent, including volatile substances, such as hydrocarbons and fluorocarbons, which does not produce decomposition products, is employed, one should face to the problem that its emission into the air is regulated as an environmental pollution and a destruction substance.

By the means in which an inert gas, such as nitrogen, or air supplied via an extruder hopper is kneaded with a resin material under pressure using a screw (see Patent Document 2), the gas is not finely dispersed in a molten resin. Thus, it is practically difficult to produce a foam layer having a desired bubble density or a desired bubble size.

In a case where means for dissolving carbon dioxide (foaming gas) in a supercritical state in a molten resin is employed (see Patent Document 3), the following problems occur. First, the means requires a generator and a feeder of the supercritical fluid. Since these apparatuses treat a high-pressure gas, the apparatuses are under a legal restriction, which complicates the installation and the operation of the apparatuses. Second, the means requires a complicated mechanism for sealing a foaming gas injected into a cylinder of an injection-molding machine. This increases the cost of the injection-molding machine. Third, an increase in sealing performance against a foaming gas reduces the plasticizing capacity and therefore the productivity. Furthermore, a foaming gas is generally injected at a controlled flow rate, which requires a complicated controlling mechanism.

Means for Solving the Problems

In view of the situations described above, it is an object of the present invention to provide an ecological multilayer-molding means of thermoplastic resins, in which the means generates no hazardous decomposition product, releases neither environmental pollutants nor environmental destruction substances in the air, does not require a generator or a feeder of a supercritical fluid under a legal restriction, which complicates the installation and the operation of the apparatuses, and can produce a multilayer-molded product that contains a foam layer having a desired bubble density or a desired bubble size. As a result of repeated investigations, the present inventors found that the above-mentioned object can be achieved with the means described below.

Accordingly, first, the present invention provides a multilayer-molding method of molding thermoplastic resins, which includes the use of: a plurality of injection-molding machines that plasticize and inject a plurality of types of thermoplastic resins as a molding material; a mold that has a cavity as a molding space to be filled with the thermoplastic resins injected by the plurality of injection-molding machines; and a clamping apparatus that can clamp the mold and open or close the mold to increase or decrease the volume of the cavity, the method including the steps of: mixing at least one thermoplastic resin selected from the plurality of types of thermoplastic resins with a foaming gas; injecting the plurality of types of thermoplastic resins into the mold cavity such that the thermoplastic resins are layered in the mold cavity; and then after increasing the volume of the mold cavity, foaming the at least one thermoplastic resin mixed with the foaming gas, wherein the foaming gas is supplied at a pressure of 0.1 MPa or more but less than 1.0 MPa to at least one injection-molding machine selected from a plurality of injection-molding machines, and the thermoplastic resin plasticized in the injection-molding machine is mixed with the foaming gas (also referred to as foaming gas mixing method).

In a multilayer-molding method of molding thermoplastic resins according to the present invention, the pressure of the foaming gas supplied to the injection-molding machine is more preferably in the range of 0.5 MPa or more but less than 1.0 MPa.

The foaming gas for use in the formation of a foam layer is generally supplied to a predetermined portion in the injection-molding machine at a pressure in the range of 0.1 MPa or more but less than 1.0 MPa. The pressure in this range allows for a simple sealing mechanism in the injection-molding machine, thus ensuring a plasticizing capacity of at least a desired level. For example, in the case of a two-stage screw, the sealing performance of the injection-molding machine is ensured by reducing a screw-flight clearance at a boundary between a first stage and a second stage. However, too narrow a screw-flight clearance prevents a molten resin from passing through the clearance, resulting in a decreased plasticizing capacity. However, the pressure range as described above allows for a relatively large screw-flight clearance, satisfying both the plasticizing capacity and the sealing performance. Furthermore, in the pressure range as described above, the emission of the foaming gas from the front-end of a resin can be reduced to an appropriate level during filling injection. Thus, a multilayer-molded product can have a desired appearance. Furthermore, when the injection rate of the foaming gas is regulated by pressure control, the saturating amount of dissolved gas most suitable for a resin used can be obtained independently of the molding conditions.

The gas-injection rate is determined by the difference in pressure between the decompression zone (gas injection position) of the two-stage screw and the injected gas. Furthermore, the amount of nitrogen gas dissolved in polystyrene (200° C.) is in the range of 0.4 mol/kg (1 MPa) to 0.6 mol/kg (10 MPa) and does not vary significantly with pressure (see Non-patent Document 1). Thus, the amount of foaming gas required for foaming can be supplied sufficiently at the pressure range of 0.1 MPa or more but less than 1.0 MPa described above. The injection of the foaming gas at the above-mentioned pressure range can therefore achieve sufficient foaming, without having a substantial influence on the product characteristics.

When the pressure of the foaming gas supplied to the injection-molding machine is less than 0.1 MPa, a foam layer having a desired bubble density or a desired bubble size cannot be formed in a desired multilayer-molded product. Furthermore, the pressure of the foaming gas supplied to the injection-molding machine is set to be less than 1.0 MPa for the following reasons. While a multilayer-molded product having a desired bubble density or a desired bubble size can sometimes be produced at 1.0 MPa, occasionally, foaming cells become coarse, and the expansion ratio varies greatly at different portions of the multilayer-molded product. In addition, the multilayer-molded product may have a defective appearance due to swirl marks. Furthermore, when the pressure of the foaming gas is as high as 1.0 MPa or more, in the molding of large multilayer-molded products, such as automobile parts, a molding apparatus that can perform such molding requires high sealing performance. However, it is difficult to achieve such high sealing performance from the viewpoint of designing. Furthermore, the facility must also be resistant to pressure. A pressure-proof facility for housing large apparatuses requires huge investments. Besides, even the present technology cannot completely clear up uneasiness about high pressure.

While the foaming gas is supplied to the injection-molding machine at a pressure of 0.1 MPa or more but less than 1.0 MPa, in terms of the foaming status, the appearance, and the flexibility of a multilayer-molded product, the pressure is more preferably in the range of 0.2 MPa to 0.99 MPa and still more preferably in the range of 0.5 MPa to 0.9 MPa. As described above, the foaming gas is supplied to a hopper for feeding a thermoplastic resin or into a molten resin in a plasticizing cylinder of the injection-molding machine as described below. This ensures sufficient dispersion and mixing of the foaming gas or the bubble-nucleating agent in a molten resin. When the foaming gas is supplied with a two-stage screw, which is employed as a screw in a plasticizing cylinder of the injection-molding machine, the foaming gas and the bubble-nucleating agent can be dispersed and mixed in a molten resin. More preferably, the screw has a highly dispersive screw head to improve the dispersibility of the foaming gas and the bubble-nucleating agent in a molten resin.

In a multilayer-molding method of molding thermoplastic resins according to the present invention, preferably, the bubble-nucleating agent is premixed with the foaming gas to be supplied into the injection-molding machine, thereby allowing the thermoplastic resin injected into a mold cavity to contain the bubble-nucleating agent.

In a multilayer-molding method of molding thermoplastic resins according to the present invention, preferably, the bubble-nucleating agent is premixed with the thermoplastic resin serving as a molding material, thereby allowing the thermoplastic resin injected into the mold cavity to contain the bubble-nucleating agent.

In a multilayer-molding method of molding thermoplastic resins according to the present invention, preferably, the bubble-nucleating agent is one or a mixture of at least two selected from the group consisting of iron oxides, calcium silicate, zinc stearate, magnesium stearate, organic acids (citric acid, tartaric acid, etc.), aluminum silicate, glass fiber, and talc.

In a multilayer-molding method of molding thermoplastic resins according to the present invention, preferably, the foaming gas is supplied to the injection-molding machine under controlled pressure.

In a multilayer-molding method of molding thermoplastic resins according to the present invention, preferably, the foaming gas is supplied to a hopper of the injection-molding machine, the hopper serving as a charge port of a thermoplastic resin to be plasticized, or into a plasticized thermoplastic resin in a plasticizing cylinder of the injection-molding machine.

In a multilayer-molding method of molding thermoplastic resins according to the present invention, preferably, the foaming gas is one inorganic gas or a mixture of at least two inorganic gases selected from the group consisting of air, carbon dioxide, and nitrogen. Examples of the foaming gas for use in multilayer molding involving a foam layer include carbon dioxide, a nitrogen gas, and air, or mixtures thereof. Air or carbon dioxide is preferred in terms of the characteristics of a multilayer-molded product. The foaming gas must be selected in consideration of the oxidation resistance of a resin. A gas other than air is preferably used for resins having a group susceptible to oxidation. Air is suitably used for resins having high resistance to oxidation, such as polypropylene, also in terms of availability. Examples of the bubble-nucleating agent include fine powders of inorganic substances, such as iron oxides, calcium silicate, aluminum silicate, glass fiber, talc, and sodium hydrogencarbonate (sodium bicarbonate); metallic salts of organic acids, such as zinc stearate and magnesium stearate; and organic acids, such as citric acid and tartaric acid. As a matter of course, in consideration of the function of the bubble-nucleating agent, for example, a metallic salt and an organic acid may be used in combination.

Examples of the thermoplastic resin for use in a multilayer-molding method of molding thermoplastic resins according to the present invention include styrene-based resins, such as polystyrene, AS resins, and ABS resins; olefin resins, such as polyethylene and polypropylene; and so-called engineering resins, including polyester resins, such as polyethylene terephthalate and polybutylene terephthalate, polyamides, polyacetals, polycarbonates, and modified polyphenylene ethers, and olefinic thermoplastic elastomers. These resins may be used in combination according to the application. Furthermore, if necessary, these thermoplastic resins may be used in combination with additive agents, such as a plasticizer, a mold-release agent, an antistatic agent, and a flame retardant; various fillers for improving physical properties, such as glass fiber and carbon fiber; and coloring agents, dyes, and the like.

The present invention also provides an automotive interior multilayer-molded product manufactured by any of the above-mentioned multilayer-molding methods of thermoplastic resins.

The present invention also provides a multilayer-molding apparatus for manufacturing a multilayer-molded product that contains a multilayer of a plurality of types of thermoplastic resins, one layer of which is foamed and composed of at least one thermoplastic resin selected from the plurality of types of thermoplastic resins. The multilayer-molding apparatus includes a plurality of injection-molding machines that plasticize and inject the plurality of types of thermoplastic resins as a molding material, a mold that has a cavity as a molding space to be filled with the thermoplastic resins injected by the plurality of injection-molding machines, a clamping apparatus that can clamp the mold and open or close the mold to increase or decrease the volume of the cavity, and a unit for supplying a foaming gas and a unit for supplying a bubble-nucleating agent each for use in the foaming.

A multilayer-molding method of molding thermoplastic resins according to the present invention includes the steps of mixing at least one thermoplastic resin selected from a plurality of types of thermoplastic resins with a bubble-nucleating agent and a foaming gas, and injecting the plurality of types of thermoplastic resins into a mold cavity such that the thermoplastic resins are layered in the mold cavity. The foaming gas is supplied at a pressure of 0.1 MPa or more but less than 1.0 MPa to at least one injection-molding machine selected from a plurality of injection-molding machines. Thus, a multilayer-molded product of thermoplastic resins that contains a foam layer having a desired bubble size and a bubble density and being free from hazardous decomposition product residues can be manufactured without using an environmentally hazardous foaming agent and a generator and a feeder of a supercritical fluid.

Furthermore, the supply pressure of the foaming gas in the range of 0.1 MPa or more but less than 1.0 MPa can simplify the mechanism for sealing the foaming gas that is supplied to a cylinder of the injection-molding machine. This prevents a reduction in plasticizing capacity. In an injection-molding, machine having a two-stage screw, the sealing performance is ensured by reducing a screw-flight clearance at a boundary between a first stage and a second stage. The screw-flight clearance must be reduced with an increase in pressure of the foaming gas. This reduces the plasticizing capacity. A multilayer-molding method of molding thermoplastic resins according to the present invention can avoid such a problem. In addition, since the foaming gas is supplied to the injection-molding machine at a pressure in the range of 0.1 MPa or more but less than 1.0 MPa, unlike conventional methods using a foaming gas in a supercritical state, a generator and a feeder of a supercritical fluid are unnecessary.

Furthermore, since the supply pressure of the foaming gas is in the range of 0.1 MPa or more but less than 1.0 MPa, the emission of the foaming gas from the front-end of a flowing molten resin during injection filling is smaller than that at a pressure of 1.0 MPa or more. Thus, a multilayer-molded product (final product) has better appearance.

In a multilayer-molding method of molding thermoplastic resins according to the present invention, the reason that the supply pressure of the foaming gas is set to be 0.1 MPa or more is that a desired bubble density or a desired bubble size cannot be achieved at 0.1 MPa or less. The reason that the supply pressure of the foaming gas is set to be less than 1.0 MPa is that the bubbles become coarse at 1.0 MPa or more, the foam layer (molded product) has a defective appearance due to swirl marks, and the multilayer-molded product has different expansion ratios at different portions, because the pressure applied to the front-end of the flowing molten resin in the injection-molding machine is greatly different from the pressure applied to the resin in the mold during injection filling.

More preferably, the foaming gas is supplied to the injection-molding machine at a pressure of 0.5 MPa or more but less than 1.0 MPa under controlled pressure. This can provide a multilayer-molded product that contains a foam layer having a denser surface and a desired bubble density or a desired bubble size.

In a preferred aspect of a multilayer-molding method of molding thermoplastic resins according to the present invention, the foaming gas is supplied to a hopper of the injection-molding machine or into a molten thermoplastic resin in a cylinder. This ensures sufficient dispersion and mixing of the foaming gas or the bubble-nucleating agent in the molten resin, which forms a foam layer. More preferably, the screw has a highly dispersive screw head to improve the dispersibility of the foaming gas and the bubble-nucleating agent in the molten resin.

In a preferred aspect of a multilayer-molding method of molding thermoplastic resins according to the present invention, the foaming gas is supplied under controlled pressure. Thus, the saturating amount of dissolved foaming gas most suitable for a thermoplastic resin used can consistently be obtained independently of the molding conditions. For example, when a two-stage screw is employed as a screw of the injection-molding machine, the amount of supplied foaming gas is determined by the difference in pressure between the decompression zone (injection position of the foaming gas) and the supplied foaming gas. Furthermore, the amount of nitrogen gas dissolved in a polystyrene resin is in the range of 0.4 mol/kg (1 MPa) to 0.6 mol/kg (10 MPa) at 200° C. and does not vary significantly with pressure (see Non-patent Document 1). Thus, the amount of foaming gas required for foaming can be supplied sufficiently at a pressure in the range of 0.1 MPa or more but less than 1.0 MPa. Furthermore, a pressure in the range of 0.1 MPa or more but less than 1.0 MPa should not have a significant on the multilayer-molded product (final product).

BRIEF DESCRIPTION OF THE DRAWINGS

FIGS. 2(a) to (f) are process drawings of a multilayer-molding method of molding thermoplastic resins according to an embodiment of the present invention.

FIGS. 3(a) to (e) are process drawings of a multilayer-molding method of molding thermoplastic resins according to another embodiment of the present invention.

Figure 1:
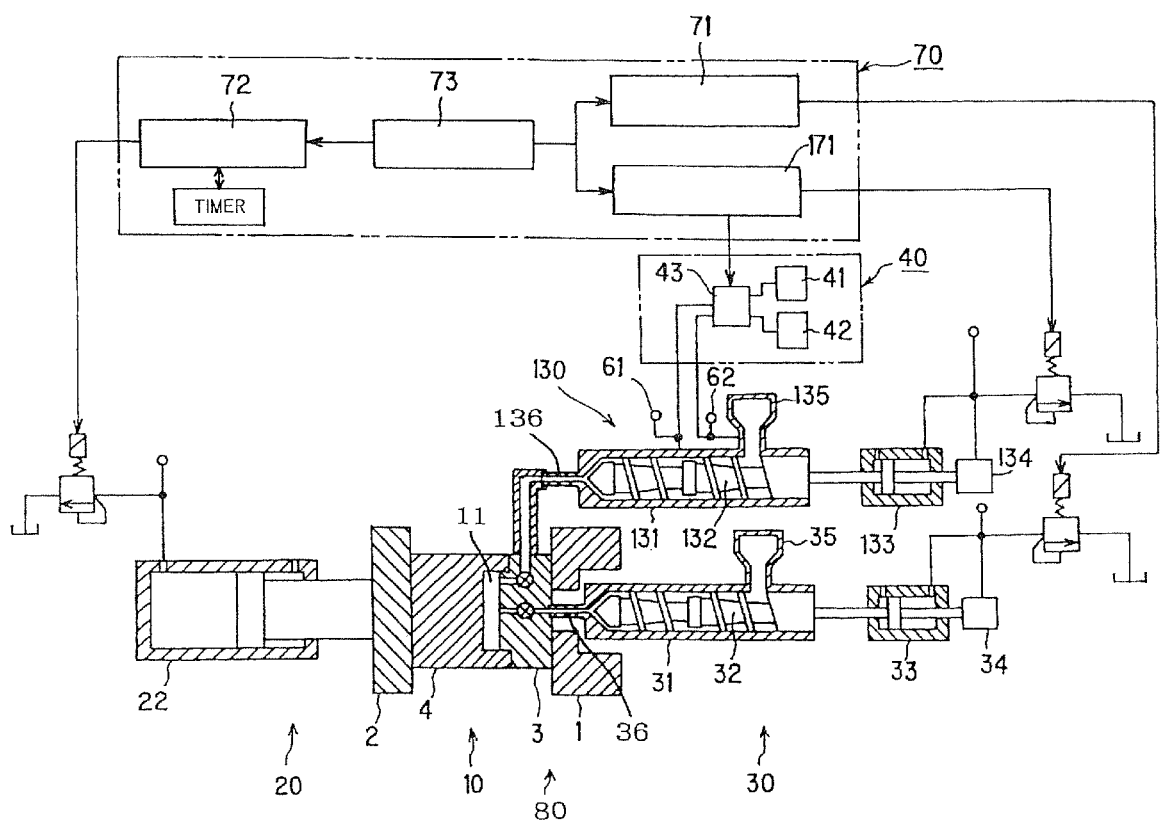
FIG. 1 is a general schematic view of a multilayer-molding apparatus according to an embodiment of the present invention.

| Reference Numerals | |
|---|---|
| 1 | stationary platen |
| 2 | movable platen |
| 3, 13 | stationary mold |
| 4 | movable mold |
| 10, 100 | mold |
| 20 | clamping apparatus |
| 30, 130 | injection-molding machine |
| 31, 131 | cylinder |
| 32, 132 | screw |
| 35, 135 | hopper |

-continued

| Reference Numerals | |
|---|---|
| 40 | means for supplying foaming gas |
| 41 | air source |
| 42 | carbon dioxide source |
| 43 | unit for supplying foaming gas |
| 61 | unit for supplying bubble-nucleating agent |
| 62 | unit for supplying bubble-nucleating agent |
| 70 | controller |
| 80 | (horizontal clamping) injection-molding machine |
| 121, 221 | non-foamed layer |
| 122, 222 | foam layer |
| 124 | (foaming-gas-free molten thermoplastic) resin |
| 125 | (foaming-gas-containing molten thermoplastic) resin |

BEST MODE FOR CARRYING OUT THE INVENTION

The present invention will be described below by way of embodiments thereof, if necessary, with reference to the drawings. However, the present invention should not be construed as being limited to these embodiments. Various changes, modifications, improvements, and substitutions may be made by a person skilled in the art without departing from the gist of the present invention. For example, while the drawings indicate suitable embodiments of the present invention, the present invention is not limited to the aspects or the information shown in the drawings. While means similar or equivalent to those described in the present specification can be applied in the implement or the verification of the present invention, suitable means are means described below.

First, a multilayer-molding apparatus according to the present invention will be described below. A multilayer-molding apparatus according to the present invention is suitable to implement a multilayer-molding method of molding thermoplastic resins according to the present invention. FIG. 1 illustrates a multilayer-molding apparatus according to an embodiment of the present invention and is a general schematic view of a horizontal clamping injection-molding machine. As illustrated in FIG. 1, an injection-molding machine 80 is composed of a mold 10, a clamping apparatus 20, two injection-molding machines 30 and 130, means 40 for supplying a foaming gas, and a controller 70.

The mold 10 is composed of a stationary mold 3, which is attached to a stationary platen 1, and a movable mold 4, which is attached to a movable platen 2. The stationary mold 3 and the movable mold 4 have a semi-positive structure, and are fitted together at a fitting part. In this fitted state, a face of the stationary mold 3 that forms a cavity 11 (cavity-forming face) and a face of the movable mold 4 that forms the cavity 11 (cavity-forming face) jointly form the cavity 11 of the mold 10. The fitting part of the semi-positive structure is located all around the cavity 11 of the mold 10. The fitting part has such a structure that a resin in the cavity 11 of the mold 10 does not leak out of the mold 10 even when the volume of the cavity 11 in the mold 10 is increased after injection filling. The clamping apparatus 20 includes a mold-clamping cylinder 22 that opens and closes the mold 10, and is designed such that the movable mold 4 can move forward and backward along tie bars (not shown) relative to the stationary mold 3.

Furthermore, the mold is not limited to the mold having the semi-positive structure, in which a resin in the cavity does not leak out during a predetermined stroke. Other molds, such as a flash mold, may be used, provided that they are applicable to the foam molding. Furthermore, an injection-molding machine equipped with a toggle type mold-clamping system, an electric servomotor type injection-molding machine, or a vertical clamping injection-molding machine may be used in place of the horizontal clamping injection-molding machine equipped with a straight hydraulic mold-clamping system.

Two injection-molding machines 30 and 130 illustrated in FIG. 1 include cylinders 31 and 131, screws 32 and 132, which are disposed within the cylinders 31 and 131 and have flights, and hoppers 35 and 135, through which molding materials are supplied to the cylinders 31 and 131, and are provided with screw-traveling means 33 and 133, which move the screws 32 and 132 forward and backward, and screw-rotating means 34 and 134, which rotate the screws 32 and 132. Heaters (not shown) are mounted on the periphery of the cylinders 31 and 131. Furthermore, the injection-molding machine 130 is designed such that a foaming gas is supplied from the means 40 for supplying a foaming gas to the hopper 135 (opening of the hopper) or into a molten resin in the cylinder 131.

The injection-molding machine 30 is designed such that the screw-rotating means 34 rotates the screw 32 to feed molding material pellets from the hopper 35 into the cylinder 31. The molding material pellets fed are heated by the heater (not shown) mounted on the cylinder 31, and are kneaded and compressed as the screw 32 rotates. The resulting molten material is transferred in front of the screw 32. The molten resin transferred in front of the screw 32 is injected into the mold through a nozzle 36 disposed at the tip of the cylinder 31 as the screw-traveling means 33 moves the screw 32 forward.

Also in the injection-molding machine 130, the same action and phenomena occur, except that the foaming gas is supplied into a molten resin. While molding material pellets fed are kneaded and compressed, the foaming gas and the bubble-nucleating agent are mixed and dispersed in a molten material. The resulting molten material is transferred in front of the screw 132. The molten resin that contains the foaming gas and the bubble-nucleating agent dispersed therein and is transferred in front of the screw 132 is injected into the mold through a nozzle 136 disposed at the tip of the cylinder 131 as the screw-traveling means 133 moves the screw 132 forward. The bubble-nucleating agent is supplied in an appropriate amount from a unit for supplying a bubble-nucleating agent described below, according to predetermined molding conditions.

While the screw-traveling means 33 and 133 of the injection-molding machines 30 and 130 are oil-hydraulic cylinders, and the screw-rotating means 34 and 134 are oil-hydraulic motors in this embodiment, the screw-traveling means or the screw-rotating means may utilize an electric servomotor. Furthermore, in place of an injection-molding machine including a single inline screw, which performs both plasticization and injection, as in the injection-molding machines 30 and 130, a screw-preplastication type injection-molding machine, which performs plasticization and injection separately, may be used. Furthermore, in place of a two-stage screw in the injection-molding machines 30 and 130, a single-stage screw may be used, for example, when the foaming gas is supplied to the hopper.

The means 40 for supplying a foaming gas includes an air source 41, a carbon dioxide source 42, and a unit 43 for supplying a foaming gas. The air source 41 and the carbon dioxide source 42 are coupled through a supply passage. Furthermore, the means 40 for supplying a foaming gas is provided with a foaming-gas-supply passage connected to gas-supply ports disposed at the cylinder 131 and at the hopper 135 of the injection-molding machine 130. The means 40 for supplying a foaming gas supplies a foaming gas to the injection-molding machine 130 according to the instruction issued by the controller 70. Furthermore, units 61 and 62 for supplying a bubble-nucleating agent are disposed in the vicinity of ends of supply passages that connect the unit 43 for supplying a foaming gas with the injection-molding machine 130. The units 61 and 62 supply a bubble-nucleating agent to a foaming gas. The bubble-nucleating agent may be added to a thermoplastic resin by previously dry-blending a powdered bubble-nucleating agent with a molding material, by the addition of a masterbatch of the bubble-nucleating agent to a molding material, or by premixing the bubble-nucleating agent with a molding material during the production of the molding material.

The controller 70 illustrated in FIG. 1 is composed of a first injection controller 171 and a second injection controller 71, which control the plasticization of a molding material, the supply of a foaming gas and a bubble-nucleating agent, and the injection of a molten resin into the mold, a clamping controller 72, which control the opening and closing of the mold 10 and the mold-clamping force, and timers. The clamping controller 72 includes a unit for setting the position to which the movable platen 2 travels and the speed of the traveling to provide a desired volume of the cavity 11 at the beginning of a foaming process for forming a foam layer of a multilayer-molded product. The clamping controller 72 can maintain the position of the movable platen 2 until the end of the foaming process. The foaming process includes the steps of detecting the completion of filling of the cavity 11 in the mold 10 with a resin to reduce the mold-clamping force, and increasing the volume of the cavity 11 in the mold 10. A skin layer and bubble nuclei are formed during the step of reducing the mold-clamping force. A higher reduction rate of the mold-clamping force results in a larger number of bubble nuclei. The rate of increasing the volume of the cavity 11 in the mold 10 depends on the elongational viscosity of a molding resin, and is desirably low for low elongational viscosity, and high for high elongational viscosity.

Taking the use of the multilayer-molding apparatus illustrated in FIG. 1 as an example and referring to FIGS. 2 and 3, a multilayer-molding method of molding thermoplastic resins according to the present invention will be described below. A multilayer-molding method of molding thermoplastic resins according to the present invention includes a step of injecting a molten resin that contains a foaming agent into a mold cavity and then increasing the volume of the mold cavity to foam the resin. The multilayer-molding method is suitable to manufacture a multilayer-molded product of thermoplastic resins that contains a foam layer and a non-foamed layer.

FIG. 2, which includes (a) to (f), is a schematic process drawing illustrating the mold 10 and two injection-molding machines 30 and 130 illustrated in FIG. 1, and illustrates a multilayer-molding method of molding thermoplastic resins according to an embodiment of the present invention. FIG. 3, which includes (a) to (e), is a schematic process drawing only illustrating a mold 100 and two injection-molding machines 30 and 130, and illustrates a multilayer-molding method of molding thermoplastic resins according to another embodiment of the present invention. The mold 10 illustrated in FIGS. 1 and 2 is designed such that the cavity 11 is filled independently with a resin that contains a foaming gas and a bubble-nucleating agent injected from the injection-molding machine 130 and with a resin that contains no foaming gas and no bubble-nucleating agent injected from the injection-molding machine 30. The mold 100 illustrated in FIG. 3 is the same as the mold 10 illustrated in FIGS. 1 and 2, except that, in a stationary mold 13, there is provided a mixing portion 150 in which a resin containing a foaming gas and a bubble-nucleating agent injected from the injection-molding machine 130, before entering into the cavity 11, flows into a resin that contains no foaming gas and no bubble-nucleating agent injected from the injection-molding machine 30. Thus, a process based on FIG. 3 will be described below with reference to FIG. 1, while the mold 100 (see FIG. 3) replaces the mold 10 illustrated in FIG. 1.

First, referring to FIG. 2, a pressure oil is fed to a piston head side of the mold-clamping cylinder 22 illustrated in FIG. 1 to move a piston rod forward, thereby moving the movable platen 2 toward the stationary platen 1 to close the mold 10. The mold-clamping force is desirably the smallest force that can prevent the mold 10 from opening owing to the filling pressure during resin filling, in view of energy consumption and the life of the molding apparatus. After the mold clamping is completed, a resin that contains no foaming gas and no bubble-nucleating agent (molding material) and then a resin that contains a foaming gas and a bubble-nucleating agent (molding material) are injected into the cavity 11 of the mold 10 according to predetermined values of the injection volume, the injection pressure, and the injection speed.

In the injection-molding machine 30, a pressure oil is fed to the screw-rotating means 34 to rotate the screw 32. The molding material fed from the hopper 35 is heated by the heater (not shown) mounted on the cylinder 31, and is kneaded and compressed as the screw 32 rotates. The resulting molten material is transferred in front of the screw 32. A pressure oil is fed to the screw-traveling means 33 to move the screw 32 forward, allowing a (molten) resin 124 (containing no foaming gas and no bubble-nucleating agent) transferred in front of the screw to be injected into the cavity 11 of the mold 10 (see FIG. 2(a)). The volume of the cavity 11 in the mold 10 is then maintained and cooled for a predetermined cooling time to form (solidify) a non-foamed layer 121 (see FIG. 2(b)).

The pressure of a pressure oil applied to a piston head side of the mold-clamping cylinder 22 is lowered to reduce the mold-clamping force. At the same time, the pressure oil is fed to the piston rod side to move the piston rod backward. This moves the movable platen 2 away from the stationary platen and opens the mold 10, thus increasing the volume of the cavity 11 (see FIG. 2(c)). The volume of the cavity 11 in the mold 10 is increased according to the setpoints of a unit for setting the position to which the movable platen 2 travels and the speed of the traveling, disposed in the clamping controller 72. The movable platen 2 stops and stays at a predetermined position.

In the injection-molding machine 130, a pressure oil is then fed to the screw-rotating means 134 to rotate the screw 132. The molding material fed from the hopper 135 is heated by the heater (not shown) mounted on the cylinder 131, and is kneaded and compressed as the screw 132 rotates. The foaming gas and the bubble-nucleating agent are mixed and dispersed in a molten material. The molten material is transferred in front of the screw 132. As a pressure oil is fed to the screw-traveling means 133 to move the screw 132 forward, the (molten) resin 125 that contains the foaming gas and the bubble-nucleating agent dispersed therein and that is transferred in front of the screw is injected between the non-foamed layer 121 previously formed and the movable platen 2 in the cavity 11 of the mold 10 (see FIG. 2(d)). After the resin filling is completed (see FIG. 2(e)), the pressure of a pressure oil applied to a piston head side of the mold-clamping cylinder 22 is lowered to reduce the mold-clamping force.

The pressure oil is then fed to the piston rod side of the mold-clamping cylinder 22 to move the piston rod backward. This further moves the movable platen 2 away from the stationary platen and opens the mold 10, thus further increasing the volume of the cavity 11. The volume of the cavity 11 in the mold 10 is increased according to the setpoints of a unit for setting the position to which the movable platen 2 travels and the speed of the traveling, disposed in the clamping controller 72. The movable platen 2 stops at a predetermined position, and maintains the position so as not to be forced back by the resin-expansion pressure in the mold 10. When the volume of the cavity 11 in the mold 10 is controlled to increase the volume of the cavity 11 in the mold 10, the resin pressure in the cavity 11 of the mold 10 starts to decrease. At the same time, foaming starts within the resin 125 that contains the foaming gas and the bubble-nucleating agent. The volume of the cavity 11 in the mold 10 is then maintained and cooled for a predetermined cooling time to form (solidify) a foam layer 122 (see FIG. 2(f)), thus producing a multilayer-molded product.

Referring to FIG. 3, a pressure oil is fed to a piston head side of the mold-clamping cylinder 22 illustrated in FIG. 1 to move a piston rod forward, thereby moving the movable platen 2 toward the stationary platen 1 to close the mold 100 (in place of the mold 10 in FIG. 1). The mold-clamping force is desirably the smallest force that can prevent the mold 100 from opening owing to the filling pressure during resin filling, in view of energy consumption and the life of the molding apparatus. After the mold clamping is completed, according to predetermined values of the injection volume, the injection pressure, and the injection speed, a resin that contains no foaming gas and no bubble-nucleating agent is injected into the cavity 11 of the mold 100, during which a resin containing a foaming gas and a bubble-nucleating agent is also injected.

In the injection-molding machine 30, a pressure oil is fed to the screw-rotating means 34 to rotate the screw 32. The molding material fed from the hopper 35 is heated by the heater (not shown) mounted on the cylinder 31, and is kneaded and compressed as the screw 32 rotates. The resulting molten material is transferred in front of the screw 32. A pressure oil is fed to the screw-traveling means 33 to move the screw 32 forward, allowing a (molten) resin 124 (containing no foaming gas and no bubble-nucleating agent) transferred in front of the screw to be injected into the cavity 11 of the mold 100 (see FIG. 3(a)).

After a predetermined amount of resin 124 that contains no foaming gas and no bubble-nucleating agent is charged, the mixing portion 150 switches the flow pass. In the injection-molding machine 130, a pressure oil is then fed to the screw-rotating means 134 to rotate the screw 132. The molding material fed from the hopper 135 is heated by the heater (not shown) mounted on the cylinder 131, and is kneaded and compressed as the screw 132 rotates. The foaming gas and the bubble-nucleating agent are mixed and dispersed in a molten material. The molten material is transferred in front of the screw 132. As a pressure oil is fed to the screw-traveling means 133 to move the screw 132 forward, the (molten) resin 125 that contains the foaming gas and the bubble-nucleating agent dispersed therein and that is transferred in front of the screw is injected inside the previously charged molten resin 124 that contains no foaming gas and no bubble-nucleating agent (see FIG. 3(b)).

Slight opening of the mold in synchronization with the charging of the molten resin 125 that contains the foaming gas and the bubble-nucleating agent allows the resin 125 to be efficiently charged inside the resin 124 (see FIG. 3(c)). Furthermore, the resin 125 may be charged while the mold 100 is opened to have a predetermined volume of the cavity 11.

When the cavity 11 is filled almost completely with the resins 124 and 125, the mixing portion 150 changes the flow pass so that the remaining resin 124 is charged (see FIG. 3(d)). This prevents the resin 124 and the resin 125 to be mixed with each other in the next molding. While the injection volumes of the resins 124 and 125 are appropriately selected, it is important to prevent the resin 125 from being exposed at the surface of the resin 124. After the molten resins 124 and 125 are completely charged, the pressure of a pressure oil applied to a piston head side of the mold-clamping cylinder 22 is lowered to reduce the mold-clamping force.

The pressure oil is then fed to the piston rod side of the mold-clamping cylinder 22 to move the piston rod backward. This further moves the movable platen 2 away from the stationary platen and opens the mold 100, thus increasing the volume of the cavity 11. The volume of the cavity 11 in the mold 100 is increased according to the setpoints of a unit for setting the position to which the movable platen 2 travels and the speed of the traveling, disposed in the clamping controller 72. The movable platen 2 stops at a predetermined position, and maintains the position so as not to be forced back by the resin-expansion pressure in the mold 100. When the volume of the cavity 11 in the mold 100 is controlled to increase the volume of the cavity 11 in the mold 100, the resin pressure in the cavity 11 of the mold 100 starts to decrease. At the same time, foaming starts within the resin 125 containing the foaming gas and the bubble-nucleating agent, which is enclosed with the resin 124 that contains no foaming gas and no bubble-nucleating agent. The volume of the cavity 11 in the mold 100 is then maintained and cooled for a predetermined cooling time to form (solidify) a non-foamed layer 221 and a foam layer 222 (see FIG. 3(e)), thus producing a multilayer-molded product.

As illustrated in FIGS. 2 and 3, even when the mold 10 or 100 is slightly opened, the stationary mold 3 or 13 and the movable mold 4 are fitted together at a fitting part. The molten resin in the cavity 11 therefore dose not leak out of the mold 10 or 100.

EXAMPLES

The present invention will be further described below with examples. However, the present invention is not limited to these examples.

Example 1

A two-layer molded product (multilayer-molded product) composed of one foam layer and one non-foamed layer was manufactured by the multilayer-molding method (foaming gas mixing method) illustrated in FIG. 2 using a horizontal toggle injection-molding machine (Ube Machinery Corporation, Ltd., UBE-MD350 injection-molding machine) as an injection-molding machine. To satisfy the rigidity and the surface texture of a molded product (final product), a polypropylene resin (PP, Mitsui Chemicals, Inc., automotive interior grade, MFR=35) was used as a resin material (molding material) for the non-foamed layer, and an olefin thermoplastic elastomer (TPO, JSR, injection-molding grade, hardness HAS=40, MFR=10) was used as a resin material (molding material) for the foam layer.

A mixture of sodium bicarbonate and citric acid was used as a bubble-nucleating agent and was premixed with the resin materials. Carbon dioxide was used as a foaming gas, and was supplied into a molten resin in a cylinder at a pressure of 0.9 MPa. A two-stage screw having a mixing head at the tip was used as a screw. A gas-seal portion was adjusted according to the pressure of the foaming gas.

The two-layer molded product was a 350×220 mm automotive interior component (glove compartment door). The foam layer of the two layers had a thickness of 2.0 mm before foaming and 4.2 mm after foaming (expansion ratio=2.1). Furthermore, the molding conditions were a resin temperature of 200° C. and a mold temperature of 30° C. The foaming status, the appearance, and the flexibility of the molded product were evaluated by visual inspection. Table 1 shows the results.

Examples 2 to 6 and Comparative Examples 1 and 2

A two-layer molded product was manufactured as in Example 1, except that the foaming gas, the supply pressure of the foaming gas, and the thicknesses of the foam layer before and after foaming were changed. The foaming status, the appearance, and the flexibility of the molded product were evaluated by visual inspection. Table 1 shows the results, together with the foaming gas, the supply pressure, and the thicknesses of the foam layer before and after foaming.

Comparative Example 3

A two-layer molded product was manufactured as in Example 1, except that no foaming gas was used, the foam layer was formed using sodium bicarbonate (inorganic chemical foaming agent), and the thicknesses of the foam layer before and after foaming were changed. The foaming status, the appearance, and the flexibility of the molded product were evaluated by visual inspection. Table 1 shows the results.

TABLE 1

| | Foaming means | Foaming agent | Supply pressure [MPa] | Thickness of second layer [mm] After foaming | Thickness of second layer [mm] Before foaming | Expansion ratio | Foaming status | Appearance | Flexibility | Relative plasticizing capacity |
|---|---|---|---|---|---|---|---|---|---|---|
| Example 1 | Foaming gas mixing | Carbon dioxide (gas) | 0.9 | 4.2 | 2.0 | 2.1 | A | A | A | 0.8 |
| Example 2 | Foaming gas mixing | Carbon dioxide (gas) | 0.5 | 3.8 | 2.0 | 1.9 | A | A | A | 0.9 |
| Example 3 | Foaming gas mixing | Carbon dioxide (gas) | 0.2 | 3.0 | 2.0 | 1.5 | B | A | B | 0.9 |
| Example 4 | Foaming gas mixing | Nitrogen (gas) | 0.5 | 4.0 | 2.0 | 2 | A | B | A | 0.9 |
| Example 5 | Foaming gas mixing | Carbon dioxide + Nitrogen (gas) | 0.7 | 4.2 | 2.0 | 2.1 | A | B | A | 0.8 |
| Example 6 | Foaming gas mixing | Air (gas) | 0.7 | 4.0 | 2.0 | 2 | A | A | A | 0.8 |
| Comparative Example 1 | Foaming gas mixing | Carbon dioxide (gas) | 10 | 6.2 | 2.0 | 3.1 | B | C | A | 0.4 |

TABLE 1-continued

| | Foaming means | Foaming agent | Supply pressure [MPa] | Thickness of second layer [mm] After foaming | Thickness of second layer [mm] Before foaming | Expansion ratio | Foaming status | Appearance | Flexibility | Relative plasticizing capacity |
|---|---|---|---|---|---|---|---|---|---|---|
| Comparative Example 2 | Foaming gas mixing | Nitrogen (gas) | 10 | 6.4 | 2.0 | 3.2 | B | D | A | 0.4 |
| Comparative Example 3 | Chemical foaming | Sodium bicarbonate | — | 3.2 | 2.0 | 1.6 | A | B | C | 1.0 |

In the foaming status shown in Table 1, A denotes excellent foaming with fine bubbles in aggregates, and B denotes the presence of coarse bubbles. In the appearance, A denotes an excellent appearance having a lesser number of swirl marks and silver streaks, B denotes a slightly large number, C denotes a large number, and D denotes a very large number of swirl marks and silver streaks. In the flexibility, A denotes excellent, B denotes slightly stiff, and C denotes stiff. The relative plasticizing capacity in Table 1 is the plasticizing capacity (kg/h) relative to that of the comparative example 3, which is taken as 1.0.

The results shown in Table 1 demonstrated that a molded product having an excellent foaming status, an excellent appearance, and high flexibility can be manufactured by a multilayer-molding method of molding thermoplastic resins according to the present invention, without a significant reduction in plasticizing capacity.

INDUSTRIAL APPLICABILITY

A multilayer-molding method of molding thermoplastic resins and a multilayer-molding apparatus according to the present invention can be utilized as means for manufacturing any multilayer-molded product. In particular, a multilayer-molding method of molding thermoplastic resins and a multilayer-molding apparatus according to the present invention can suitably be utilized as means for manufacturing products that require both high appearance quality and rigidity, for example, two-wheeled vehicle parts, automobile parts, household electrical appliances, and home equipment parts.

The invention claimed is:
1. A multilayer-molding apparatus for manufacturing a multilayer-molded product that contains a multilayer of a plurality of types of thermoplastic resins, one layer of which is foamed and composed of at least one thermoplastic resin selected from a plurality of types of thermoplastic resins, the apparatus comprising:
   a plurality of injection-molding machines, at least one of which being a two-stage screw injection molding machine, that plasticize and inject a plurality of thermoplastic resins as molding materials, each of the plurality of two-stage screw injection-molding machines has a reduced screw-flight clearance at a boundary between a first stage and a second stage;
   a mold that has a cavity as a molding space to be filled with the thermoplastic resins injected by the plurality of injection-molding machines;
   a clamping apparatus that can clamp the mold and open or close the mold to increase or decrease a volume of the cavity; and
   a unit for supplying a foaming gas to the two-stage screw at a pressure of 0.1 MPa or more but less than 1.0 MPa and a unit for supplying a bubble-nucleating agent for use in the foaming,
   wherein reducing a screw-flight clearance at the boundary between the first stage and the second stage of the two-stage screw results in sealing performance of the two-stage screw at the foaming gas supply pressure of 0.1 MPa or more but less than 1.0 MPa, a pressure at which desired plasticizing capacity can be maintained and sufficient foaming can be achieved at the reduced screw-flight clearance.

2. The multilayer-molding apparatus of claim 1, wherein the foaming gas is supplied to the two-stage screw at a part selected from the group consisting of a hopper and a cylinder.

3. The multilayer-molding apparatus of claim 2, wherein the foaming gas is supplied to the two-stage screw at the hopper.

* * * * *